(12) United States Patent
Pölönen

(10) Patent No.: US 9,378,653 B2
(45) Date of Patent: Jun. 28, 2016

(54) DEVICE FOR PRESENTING MUSICAL CONCEPTS

(71) Applicant: perTunes Oy, Klaukkala (FI)

(72) Inventor: Perttu Pölönen, Klaukkala (FI)

(73) Assignee: PERTUNES OY, Klaukkala (FI)

( * ) Notice: Subject to any disclaimer, the term of this patent is extended or adjusted under 35 U.S.C. 154(b) by 0 days.

(21) Appl. No.: 14/759,915

(22) PCT Filed: Jan. 16, 2014

(86) PCT No.: PCT/FI2014/050036
§ 371 (c)(1),
(2) Date: Jul. 8, 2015

(87) PCT Pub. No.: WO2014/111627
PCT Pub. Date: Jul. 24, 2014

(65) Prior Publication Data
US 2015/0356880 A1    Dec. 10, 2015

(30) Foreign Application Priority Data

Jan. 18, 2013  (FI) .................................... 20135054

(51) Int. Cl.
*G09B 15/00* (2006.01)
*G10C 3/00* (2006.01)
*G10G 1/02* (2006.01)
*G09B 15/02* (2006.01)

(52) U.S. Cl.
CPC .............. *G09B 15/008* (2013.01); *G09B 15/00* (2013.01); *G09B 15/02* (2013.01); *G10C 3/00* (2013.01); *G10G 1/02* (2013.01)

(58) Field of Classification Search
CPC ........ G09B 15/00; G09B 15/003; G09B 5/06; G09B 15/06; G09B 11/00; G09B 11/02; G09B 11/04; G09B 13/00; G09B 15/008; G09B 17/00; G09B 19/00; G09B 21/008; G10H 2210/576; G10H 2220/021
USPC .............. 84/470 R, 471 R, 472–475, 471 SR, 84/477 R, 476
See application file for complete search history.

(56) References Cited

U.S. PATENT DOCUMENTS

| 10,217 | A | 11/1853 | Tillman |
| 229,545 | A | 7/1880 | McClain |
| 2,473,222 | A | 6/1949 | Ruben et al. |
| 4,305,323 | A | 12/1981 | Graham |

(Continued)

OTHER PUBLICATIONS

Alina Abraham, "The Zone of Musical Creativity: Harmonic Series Structures—from Pictorial Representation to a Method of Teaching", Proceedings—2012 7th International Conference on Knowledge, Information and Creativity Support Systems, Aug. 11, 2012, IEEE Computer Society, pp. 207-210.

*Primary Examiner* — Kimberly Lockett
(74) *Attorney, Agent, or Firm* — Birch, Stewart, Kolasch & Birch, LLP

(57) ABSTRACT

A device for presentation of musical concepts includes a scale plate having a periodical 12-step scale with equally spaced symbols for 12 notes with half-note intervals, wherein symbols of 12 consecutive notes form an octave. The device also includes at least one pointer plate, which includes a start symbol. The pointer plate is configured to revolve with respect to the scale such that the start symbol is settable to align with the symbol of any of the 12 notes of the scale. The pointer plate includes 7 pointers specific to a given class of keys wherein, when the start symbol points to a base note of a key, the pointers specific to the class of keys point to the symbols of the notes of the key beginning at the base note.

11 Claims, 5 Drawing Sheets

(56) References Cited

U.S. PATENT DOCUMENTS

| | | | | |
|---|---|---|---|---|
| 4,881,443 A | * | 11/1989 | Bertram | G09B 15/026 84/473 |
| 4,961,362 A | * | 10/1990 | Gunn | G09B 15/007 84/474 |
| 5,173,566 A | | 12/1992 | Hiraoka | |
| 2005/0061140 A1 | | 3/2005 | Vallery | |

* cited by examiner

DEVICE FOR PRESENTING MUSICAL CONCEPTS

PARENT CASE INFORMATION

The present invention claims priority from Finnish application No. 20135054 filed 18 Jan. 2013 and is a national-stage application of PCT application No. PCT/FI2014/050036, filed 16 Jan. 2014 and published as WO2014/111627. The entire contents of the above-identified parent applications is incorporated herein by reference.

FIELD OF THE INVENTION

The present invention relates to a mechanical device which is applicable to presenting concepts relating to music.

BACKGROUND OF THE INVENTION

Presentation of concepts relating to music has typically relied on traditional sheet music and textbooks printed on paper. These traditional techniques have recently been replaced by means of information technology, such as teaching programs running on computers.

The traditional paper-based sheet music and textbooks are handicapped by a certain lack of visual clarity. For instance, students commencing their studies of music find it difficult to grasp, based on musical staff notation, the fact that all major scales consist of equally sized steps or intervals, and the mutual differences among the major scales is limited to the tone that begins the scale. The same holds for all mutually similar scales, such as minor scales.

Computer programs make it easy to produce sounds corresponding to notes, and thus to illustrate the mutual similarity among the different scales, ie, the fact that the sole difference between any two scales is in the tonal height, and that all major scales or all minor scales comprise identical series of intervals. On the other hand, computer programs, suffer form certain problems relating to teaching, such as the problem that the act of producing a sound by a computer does not teach the student to produce the sound in questions themselves. In other words, a computer program does not necessarily improve the student's motoric memory. In addition, it is frequently difficult to place a computer physically on a music stand, or anywhere else in the natural field of vision of the player.

SUMMARY OF THE INVENTION

It is thus an object of the present invention to alleviate or solve one or more of the problems identified above. Specifically, it is an object of the present invention to provide devices for presenting musical concepts that have the ability to improve a student's motor skills. The object of the invention is attained with a device according to claim 1. The dependent claims and the following description and drawings present various specific embodiments that solve additional problems and/or provide additional benefits.

According to the invention, there is produced a device for presentation of musical concepts, the device comprising:
- a scale plate having a periodical 12-step scale with equally spaced symbols for N*12 notes with half-note intervals, wherein notes corresponding to 12 consecutive symbols form an octave, and wherein N=1, 2, 3, . . . ;
- at least one pointer plate, which comprises a start symbol, wherein the pointer plate is configured to revolve with respect to the scale in such a manner that the start symbol is settable to align with the symbol of any of the 12 notes of the scale; and
- wherein the pointer plate comprises N*7 pointers specific to a given class of keys wherein, when the start symbol points to a base note of a given key, the pointers specific to the class of keys point to the symbols of the notes of the key beginning at the base note.

In musical terminology, "key" can refer at least to two things, depending on context. For instance, C major is a major key whose base note is C. In addition, key=major may refer to the set or class of keys beginning from a base note. In this presentation it is the intention that a singular "key", such as C major or D minor, means the set of notes beginning from a given base note, wherein the set comprises seven notes spaced by precisely defined intervals. Accordingly, a "class of keys" means the set of keys having the same mutual intervals. For instance, the mutual intervals of the class of major keys are {1, 1, ½, 1, 1, 1, ½}. For example, C major, D major, etc. are, major keys beginning from the C or D note, respectively. As is well known to those familiar with foundations of music, when the notes of a key are recited, it is customary to repeat the base note of the key raised by one octave. For instance, the notes of the C major key are often recited as {C, D, E, F, G, A, B, C} (In some countries, H is substituted for B). To put it more precisely, a period of one octave comprises 12 notes spaced at half-note intervals, and a period of one key comprises seven notes, wherein the set of intervals subsequent to the notes is specific to the class of keys.

All major keys form the class of major keys. Similarly, all minor keys form the class of minor keys. To put it more precisely, a distinction can be made among natural minor keys, harmonic minor keys and melodic minor keys. In addition to these, there are classes of church modes.

Because each period of a key comprises seven notes, each of which is followed by an interval, the keys repeat as periods. This is readily apparent from the keyboard of a keyboard instrument. Because of this periodicity, it is advantageous that the symbols of the 12 notes in the inventive presentation device are placed on the perimeter of a circle. By turning the pointer plate with respect to the scale in such a manner that the start symbol is aligned with the base note of a key, the pointer plate specific to the class of keys indicates the symbols of the notes belonging in the key in question. If the scale plate is overlaid with a pointer plate specific to another class of keys, such as natural minor keys, and if the start symbol is aligned with the base note of a given key, this other pointer plate will indicate all the symbols of the notes of this key. For instance, the mutual intervals in the class of natural minor keys {1, ½, 1, 1, ½, 1, 1}.

A surprising discovery can be made now. Let us write the mutual intervals of major keys twice in succession, from the end to the beginning: {½, 1, 1, 1, ½, 1, 1, ½, 1, 1, 1, ½, 1, 1}. Beginning at the fourth note, we can recognize the mutual intervals of the class of natural minor keys. This means that in some embodiments of the invention, the pointer plate of the class of natural minor keys can be obtained by reversing the pointer plate of the class of major keys (the visible and verso sides are swapped), and by selecting the start point appropriately. The class of harmonic minor keys nevertheless require a specific pointer plate because the interval of ½ notes comprised in it are absent form the major scale.

In a typical implementation N=1, or the scale plate comprises exactly one scale, whereby a half note corresponds to an angle of 60° and a half note to an angle of 30°.

Some implementations of the inventive device further comprise pointers for indicating the symbols of notes belonging in the common chord (triad) of the class of keys in question. These pointers can be placed on the pointer plate. Alternatively they can be distinct pieces, and the device further comprises a set of modular interval elements, wherein two consecutive pointers can be spaced by one or more interval elements, wherein the interval elements form an interval, which is a multiple of a half-note.

A benefit of the inventive device over conventional sheet music is a clear visualization of the regularities relating to the keys, for example. Because the inventive device comprises simple mechanical elements, such as the scale plate and the pointer plate rotatable about it, the periodicity relating to important musical concepts can be visualized in a particularly concrete manner. Similarly, as compared with computer programs, which are ubiquitous in teaching today, the clear mechanical construction relating to the invention makes the periodic concepts literally touchable. Another benefit over computer programs is that the invention can be implemented in a manner wherein no electricity is needed. Yet another advantage over, say, laptop computers is that the inventive device can be implemented in a such a manner that placing the device in the vicinity of a musical instrument is much easier than placing a computer.

BRIEF DESCRIPTION OF THE DRAWINGS

In the following section, specific embodiments of the invention will be described in greater detail in connection with illustrative but non-restrictive examples. A reference is made to the following drawings.

DETAILED DESCRIPTION OF SOME SPECIFIC EMBODIMENTS

Figure 1:
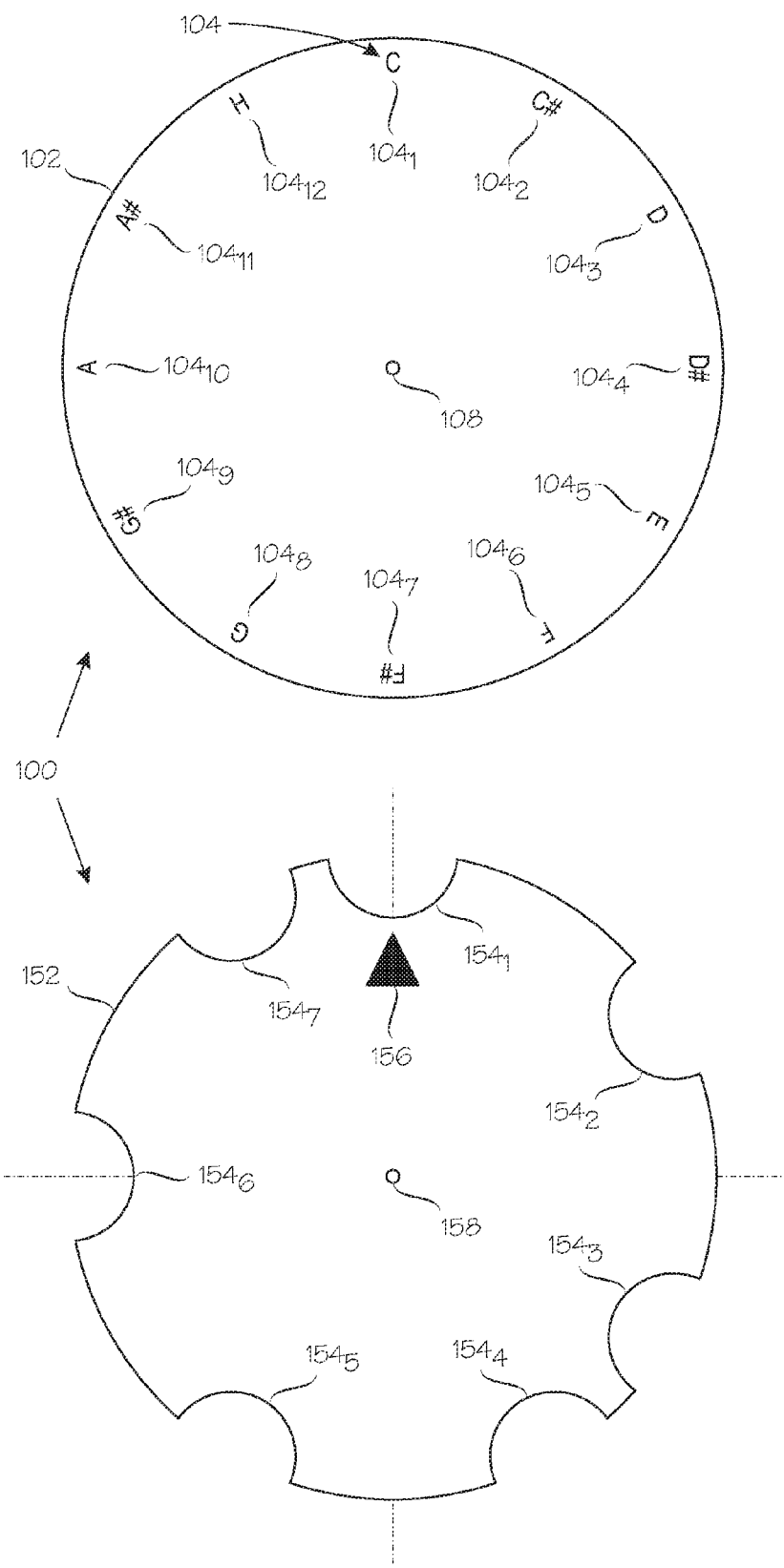
FIG. 1 shows a scale plate and a pointer plate of a presentation device according to an embodiment of the invention.

FIG. 1 shows a scale plate and a pointer plate of a presentation device according to an embodiment of the invention. Reference number 100 denotes the presentation device as an assembly. The presentation device 100 comprises a scale plate 102 and a pointer plate 152. Reference numbers 108 and 158 denote means which enable rotation of the pointer plate 152 with respect to the scale plate 102. In this embodiment, the means 108, 158 are implemented, for example, in the form of an axle and a hole wherein one plate (eg the scale plate) has an axle configured to fit into a hole in the other plate (eg the pointer plate). What is essential here is that the pointer plate 152 is changeable and it is rotatable with respect to the scale plate 102. Within these constraints, other implementations are possible. For instance, the perimeter of the scale plate 102 may have a raiser (not shown) to hold the pointer plate 152 in place from the outside, yet permitting it to rotate with respect to the scale plate 102.

12 equally spaced symbols $104_1 \ldots 104_{12}$ are placed on the scale plate 102, wherein the notes corresponding to these symbols form a scale 104, which in Western music spans one octave. In Western music one octave is a period whose physical meaning is such that, if two notes a one octave from each other, the ratio of frequencies between these notes is as simple as possible, namely 1:2. The names of notes are repeated after movements of one octave up- or downwards. The notes corresponding to the symbols $104_1 \ldots 104_{12}$ are spaced at one half-note intervals. In FIGS. 1-4, the notions C#, D#, etc. mean sharp notes, ie, C sharp, D sharp, etc. In Anglo-Saxon countries B can be substituted for H, and in some countries C, D, etc. can be replaced by symbols Do, Re, etc.

The pointer plate 152 is specific to a class of keys. For instance, the pointer plate 152 shown in FIGS. 1-4 is specific to the class of major keys. The pointer plate 152 has a start symbol 156, which should be set to align with the base note of the key. In addition, the pointer plate 152 comprises seven pointers $154_1 \ldots 154_7$, which point to symbols of seven notes in the key that is determined by the class of keys (major, minor, . . . ) corresponding to the pointer plate 152 and the base note indicated by the start symbol 156.

According to the embodiment shown in FIGS. 1-4, the pointers $154_1 \ldots 154_7$ point to symbols of seven notes, while hiding the symbols of notes not belonging to the key. Hiding of the symbols of notes not belonging to the key expedites finding the notes that do belong to the key on the scale plate 102.

Figure 2:
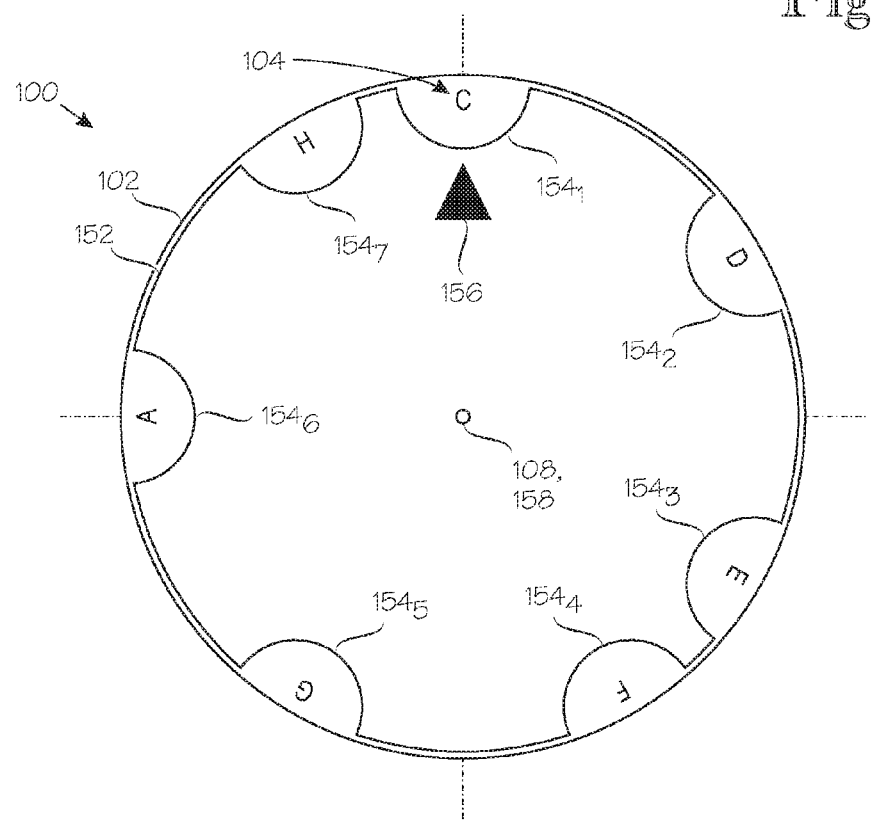
FIG. 2 shows the presentation device according to FIG. 1, when the pointer plate for major keys has been set up to indicate the notes of C major key.

FIG. 2 shows the presentation device 100 according to FIG. 1, when the scale plate 102 is overlaid by a pointer plate 152 for the class of major keys (the pointer plate being closer to the viewer than the scale plate), and its start symbol 156 has been set up to align with the C note. In this case the pointer plate 152 for the class of major keys indicates the notes of C major. When the start symbol is set up to align with the D note, the pointer plate 152 for the class of major keys indicates the notes of C major. This case is shown in FIG. 3.

Figure 4:
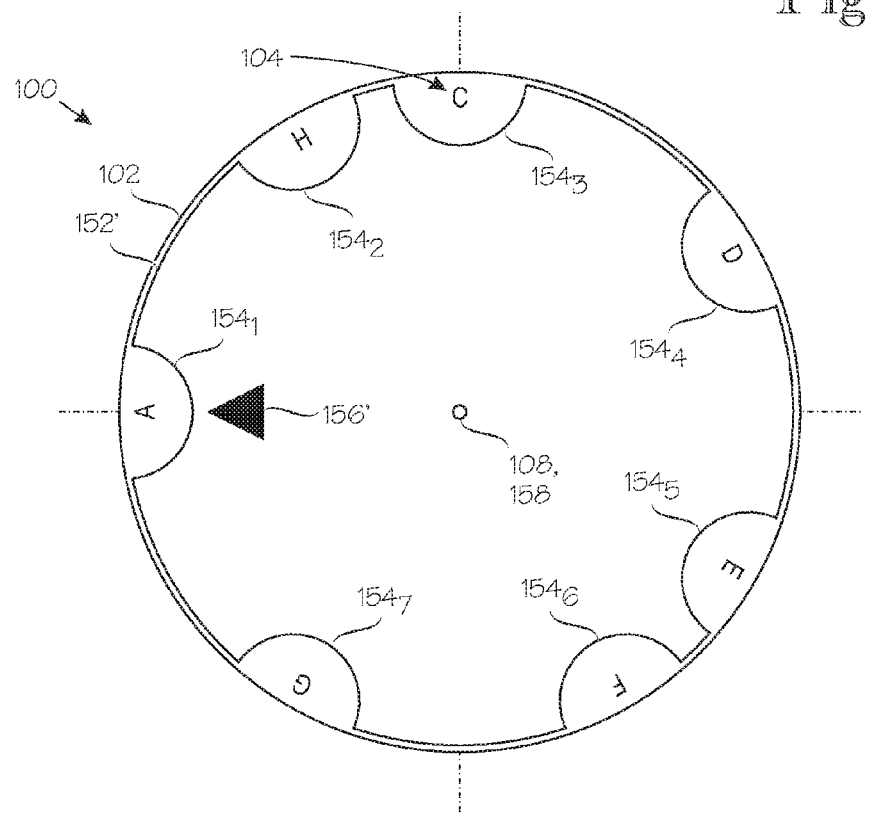
FIG. 4 shows the presentation device according to FIG. 1, when the pointer plate for minor keys has been set up to indicate the notes of A minor key.

FIG. 4 shows the presentation device according to FIG. 1, when the pointer plate 152' for minor keys, more specifically for natural minor keys, has been set up to indicate the notes of A minor key. The start symbol 156' is set up to align with the A key.

Figure 3:
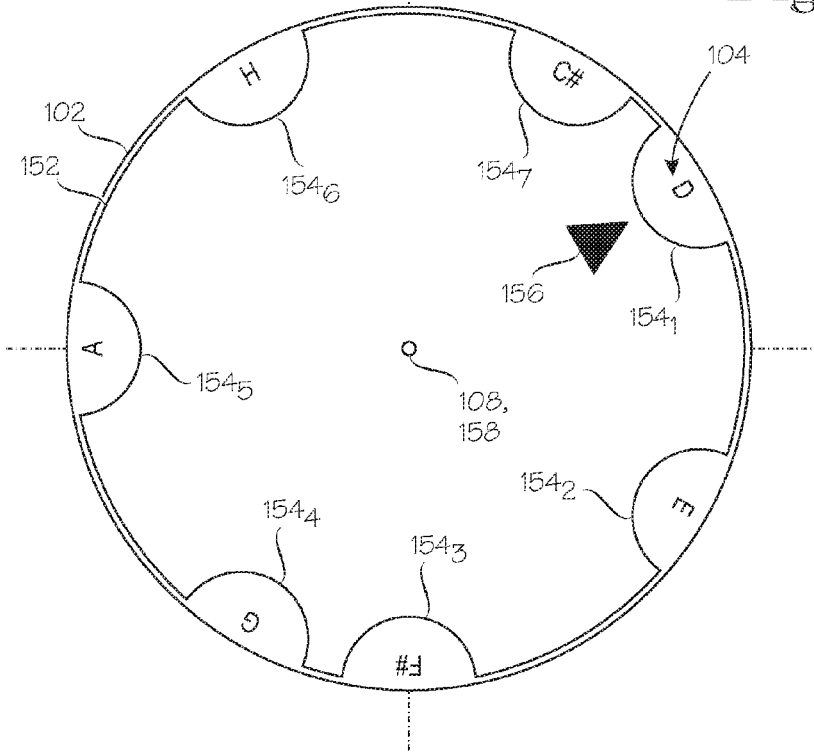
FIG. 3 shows the presentation device according to FIG. 1, when the pointer plate for major keys has been set up to indicate the notes of D major key.

As already suggested in the general portion of this disclosure, a comparison of FIGS. 2 and 3 yields the discovery that the shapes of the pointer plate 152 for major keys and the pointer plate 152' for natural minor keys are mirror images of each other. In addition, the corresponding start symbols 156, 156' are positioned differently. This means that the pointer plate 152 for major keys and the pointer plate 152' for natural minor keys can be implemented as one physical piece, by indicating either side of the pointer plate the class of keys (major or minor) the side belongs to, and my marking the start symbols 156, 156 at appropriate locations. On the pointer plate 152 for major keys the start symbol 156 is located at a place from which the clock-wise jumps to the symbols of the notes belonging to the key are {60°, 60°, 30°, 60°, 60°, 60°, 30°}. This is because an octave is divided into 12 half-notes, whereby 30° and 60° corresponds to a half note and a full note, respectively. Correspondingly, on the pointer plate 152' for minor keys the start symbol 156' is located at a place from which the clock-wise jumps to the symbols of the notes belonging to the key are {60°, 30°, 60°, 60°, 30°, 60°, 60°}.

Similarly, the observation can be made that by changing the position of the start symbol, the same pointer plate can indicate the symbols of the notes of various church modes. For instance, the Ionian key corresponds to ordinary major key, and the Dorian key comprises the notes of C major key, beginning from D. Accordingly, the pointer plate for ordinary major keys is operable in connection with the Ionian key. The same pointer plate is also operable in connection with the Dorian key, if the start symbol is rotated 60° clockwise. In other words, in cases of Ionian C key and Dorian D key the pointer plate is positioned equally, and the notes comprised by the keys are the same, but the keys begin from different start points. By using the pointer plate for major keys and by rotating the start symbol clockwise by n*60°, we get:

Ionian key=ordinary major key

Dorian scale, when the start symbol is rotated clockwise by 60°

Phrygian scale, when the start symbol is rotated clockwise by 120°

Lydian scale, when the start symbol is rotated clockwise by 150°

Mixolydian scale, when the start symbol is rotated clockwise by 210°

Aeolian scale, when the start symbol is rotated clockwise by 270°

Locrian scale, when the start symbol is rotated clockwise by 330°.

In the present connection the pointer plate 152, 152' specific to a class of keys can refer to the front and rear sides of the same physical piece. The class of harmonic minor keys requires its own physical pointer plate (not shown). Its intervals, clockwise from the start symbol, are {60°, 30°, 60°, 60°, 30°, 90°, 30°}. This is because the seventh note (which follows the sixth interval) is 1½ steps.

The embodiments shown in FIGS. 1-4 are based on the assumption that the 12 notes of one octave have been placed on the scale plate 102, and the pointer plate specific to a class of keys indicates seven of the 12 notes. This is not the only possible implementation, and it is naturally possible to place N*12 notes on the scale plate, wherein N=1, 2, 3, . . . , etc. Accordingly, the pointer plate indicates the symbols of N*7 notes.

Figure 5:
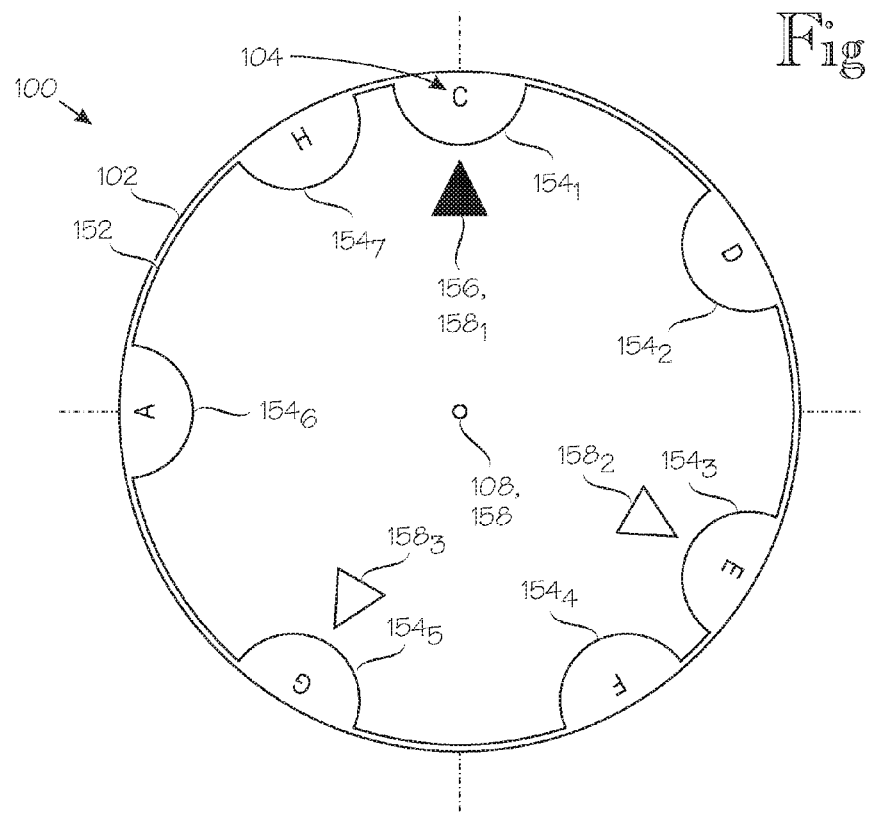
FIG. 5 shows an implementation wherein the pointer plate additionally comprises pointers corresponding to the notes of a triad.

FIG. 5 shows an implementation wherein the pointer plate 152 further comprises pointers $158_1 \ldots 158_3$ corresponding to the notes of a triad. A benefit of this implementation is that depending on the orientation of the start symbol, the same pointer plate indicates the notes of all keys and triads of a class of keys.

Figure 6:
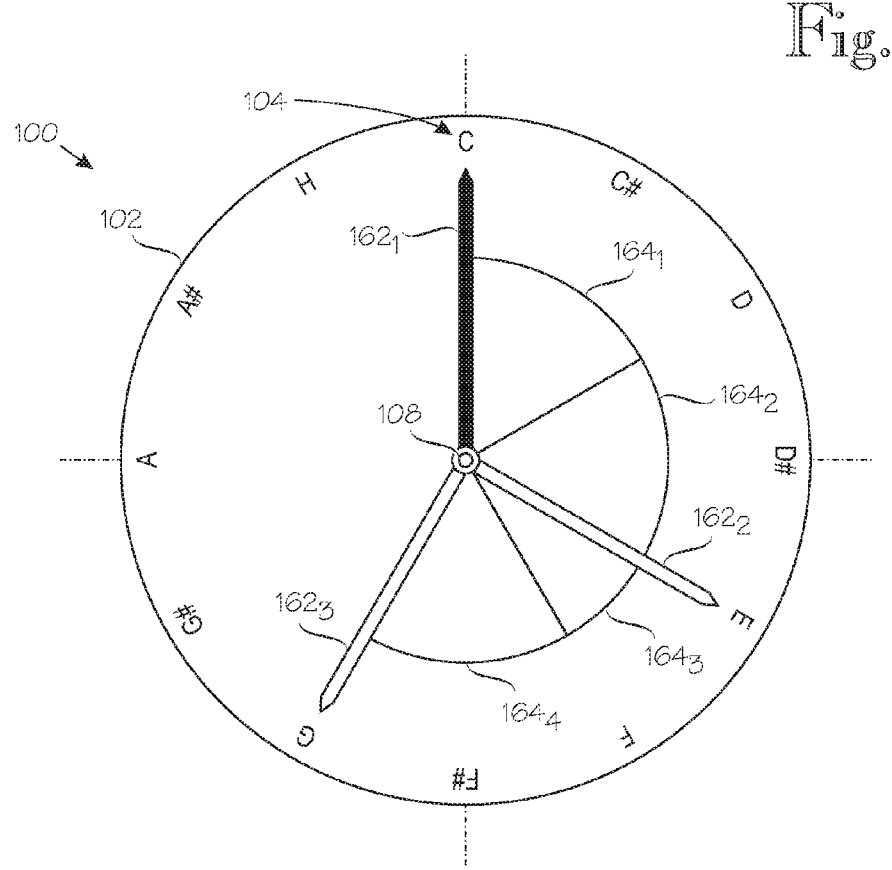
FIG. 6 shows an implementation wherein indicators for various chords can be formed by construction elements corresponding to notes and intervals.

FIG. 6 shows an implementation wherein indicators for various chords can be formed by construction elements corresponding to notes and intervals. The implementation according to FIG. 6 comprises note indicators, three of which are shown in this example: $162_1 \ldots 162_3$. Indicator $162_1$ indicates the base or root note of the triad. The other indicators, herein $162_2, 162_3$ indicate the other notes of the triad. The indicators $162_1, 162_2$ and $162_3$ can be similar, and differently colored on different sides, wherein different coloring may indicate the base note of the triad. One or more note indicators $162_1 \ldots 162_3$ is supported by the axle 108 of the pointer plate 152, or by another means that enables rotation of the pointer plate 152 with respect to the scale 104. To simplify FIG. 6, the pointer plate 152 has been omitted, but this is not necessary.

Elements $164_1 \ldots 164_4$ corresponding to the intervals are placed between the note indicators $162_1 \ldots 162_3$. The major triad is composed of three notes separated by two third intervals of which the first is a major interval and the second is a minor interval. In the example of FIG. 6, two elements $164_1$ and $164_2$, both of which form a 60° angle, have been placed between indicators $162_1$ and $162_2$, which correspond to the base and second notes of the triad. Between indicators $162_3$ and $162_4$, which correspond to the second and third notes of the triad, two elements $164_3$ and $164_4$ have been placed, wherein the first forms a 30° angle and the second a 60° angle, or 1½ notes in total. A minor triad can be obtained as a mirror image of the major triad, in such a manner that the base and second notes are separated by a minor third (90°), and the second and third notes by a major third (120°). An angle of 60° corresponds to a whole note interval if the perimeter of the circle corresponds to one octave.

The note indicators $162_1 \ldots 162_3$ and interval elements $164_1 \ldots 164_4$ shown in FIG. 6 can be used to form major or minor triads. By rotating the note indicators $162_1 \ldots 162_3$ and interval elements $164_1 \ldots 164_4$ between them in such a manner that the first note indicator indicates the base note of the triad, it is possible to present the triads of any major or minor scale. More complex chords require a few more elements, but the principle is apparent from FIG. 6. The note indicators and interval elements can be implemented as a construction set with magnetically interlocking pieces, for instance. By way of example, the north pole of the magnets can be placed at the leading edge (in clockwise rotation) of interval elements or sectors, while the south pole is placed at the trailing edge, or vice versa. Alternatively, the leading edges of the interval elements may comprise spikes that protrude into holes or recessions at the trailing edge of the preceding interval element, possibly through holes in the note indicators.

Figure 7:
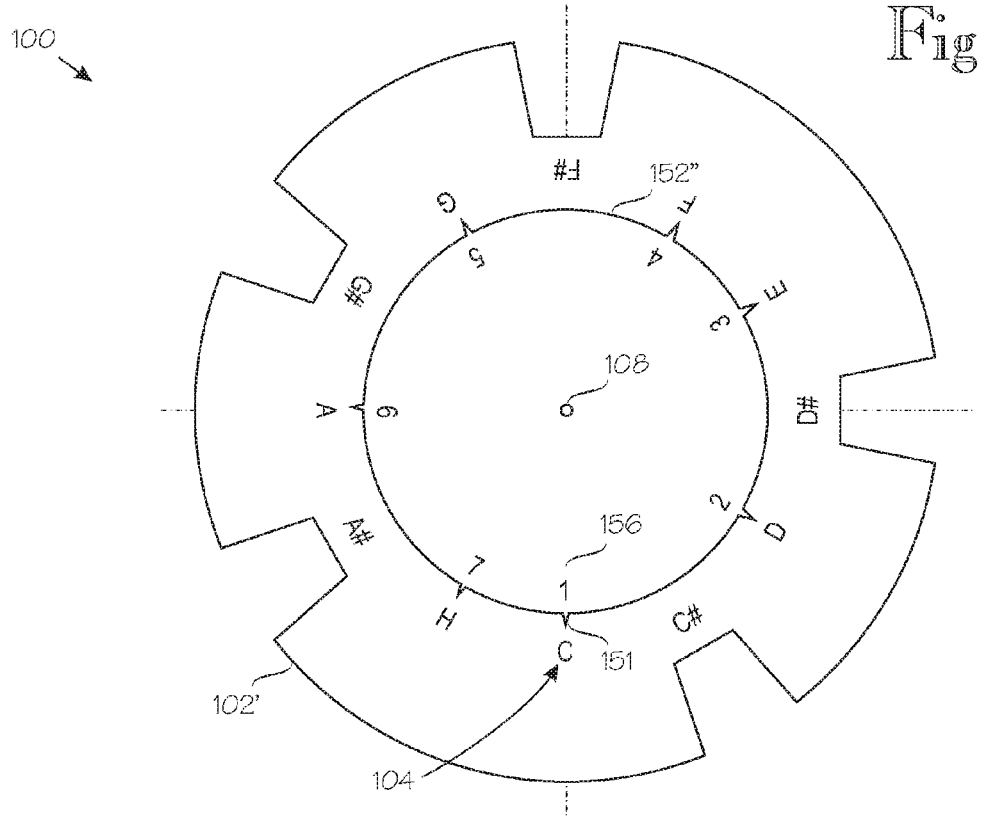
FIG. 7 shows an implementation wherein the pointer plate has been cut to correspond with the black keys of a keyboard instrument.

FIG. 7 shows an implementation wherein the scale plate has been cut to correspond with the raised ("black") keys of a keyboard instrument, or to express it more precisely, keys whose corresponding notes do not belong in the C major key. Reference number 102' denotes such a cut scale plate. In the scale plate 102', a half note corresponds to the width of a white key of a piano, and the scale plate 102' additionally comprises cutouts corresponding to the black keys of the piano. As a result, the scale plate 102' can be placed on top of the keyboard of the piano, and it can be rotated in such a manner that the note symbols on the scale 104 are directly aligned with the corresponding key of the piano. The structure formed by the cutouts and the black keys of the piano is analogous with a toothed gear and rack. This kind of a structure facilitates finding the right keys on the keyboard of a keyboard instruments.

The implementation shown in FIG. 7 also comprises a feature wherein the all notes of an octave, from C, C#, through H (item 104), are shown on the scale plate 102', and the pointer plate, denoted herein by 152'', contains seven pointers 151 numbered 1 through 7, to indicate which notes belong in the key that starts at 1. The pointer 151 marked by "1" thus serves as the start symbol 156.

Figure 8:
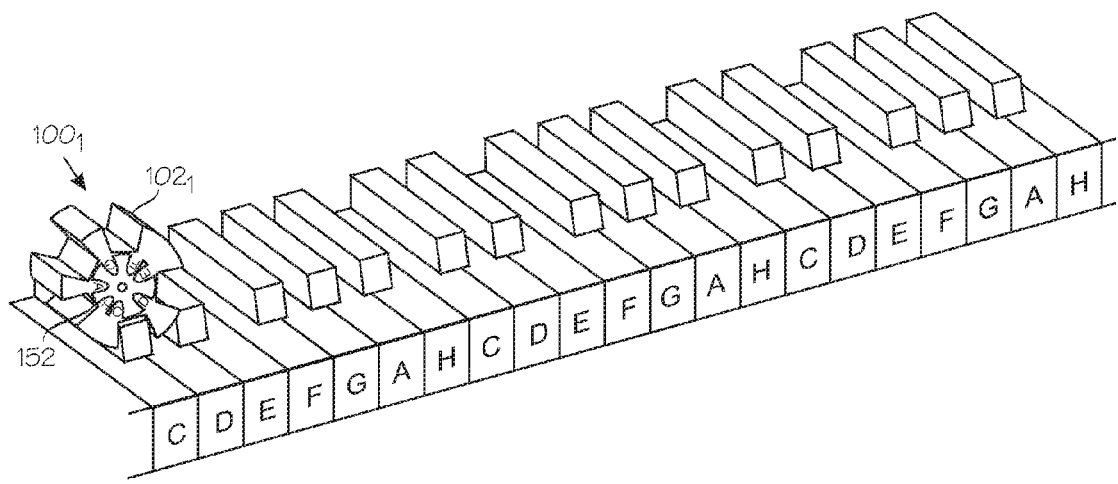
FIGS. 8, 9 and 10 shows different embodiments which aim at improving positional stability of the presentation device.
Figure 9:
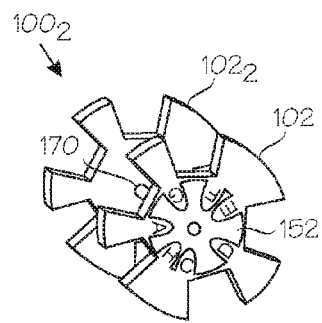
Figure 10:
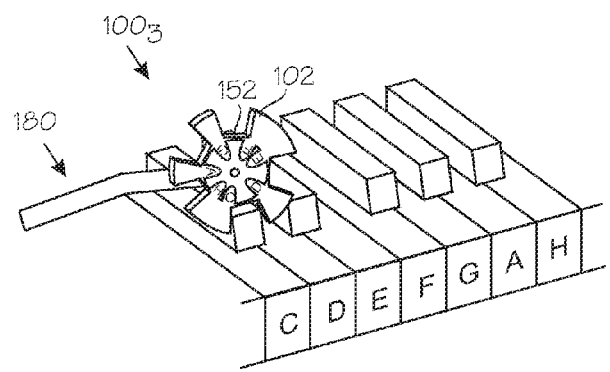

FIGS. 8, 9 and 10 shows different embodiments which aim at improving positional stability of the presentation device. FIG. 8 shows an embodiment $100_1$, in which the scale plate, denoted herein by reference number $102_1$, has a substantial material thickness in the direction of its rotational axis (or in other words, in the direction normal to its flat surface). When that rotational axis is aligned with the long edges of piano keys, the scale plate $102_1$ can rest on the piano keys without falling, even in the absence of external support. FIG. 9 shows an embodiment $100_2$, which is functionally equivalent to the embodiment $100_1$ shown in FIG. 8. In this embodiment, a proximal scale plate 102, ie a scale plate facing the user, is connected to a distal face plate 102₂ by an axle 170. Only the proximal face plate 102 needs to be provided with a pointer plate 152. In the embodiments shown in FIGS. 8 and 9 the presentation device 100₁, 100₂ should have a substantial thickness in the direction of its rotational axis. That substantial thickness is at least 10 mm and preferably at least 15 mm or 20 mm.

FIG. 10 shows an embodiment, denoted by reference number 102₃, which has a thin scale plate 102 provided with a support 180, such as a handle. In the present context, a "thin" scale plate means a scale plate which is susceptible of falling down when the keys beneath it are played. To support the presentation device 102₃ in its intended position, the user or a teacher or assistant supports the presentation device 102₃ by its handle 180.

Dimensions of piano keys vary slightly. The length of an octave on a grand piano is approximately 164 mm, and the presentation device should be dimensioned accordingly. What this means is that a rotation of the presentation device 100₁ through 102₃ by a full circle (360°) about its rotational axis should result in lateral (in left-to-right direction as seen from the user) movement of about 164 mm. If the cutouts in the scale plates 102 are shallower than the height of the black keys, the presentation device will rest on top of the black keys and the rim of the scale plate 102 does not reach as far as the white keys. In this case, an imaginary rim, as defined by extension of the cutouts so that the rim meets the tops of the white keys, should advance about 164 mm for each 360° rotation. For the keyboard of a grand piano a circumference of 160 to 170 mm is considered ideal. For a smaller or larger piano, the dimensions should be proportionally smaller, for example between 140 mm and 180 mm.

Those skilled in the art will realize that the inventive principle may be implemented in various ways. In particular, it should be noted that the drawing figures contain various optional features that can be combined in manners not explicitly shown in the drawings. For instance, the reversible or double-sided pointer plate, whose one side is for major keys and the other side for minor keys as shown in FIGS. 2-4, can be implemented in any of the other embodiments. The multiple pointers for indicating chords or intervals, as shown in respective FIGS. 5 and 6, or the notches of the scale plates, by which the presentation device engages the raised keys of a keyboard, as shown in FIG. 7, are also features that can be implemented in any of the embodiments. The same applies for the features that increase positional stability, as shown in FIGS. 8, 9 and 10. Thus the invention and its embodiments are not limited to the examples above but can be varied within the scope of the attached claims.

The invention claimed is:

1. A device for presentation of musical concepts, the device comprising:
   a scale plate having a periodical 12-step scale with equally spaced symbols for N*12 notes with half-note intervals, wherein symbols corresponding to 12 consecutive notes form an octave, and wherein N is a positive integer;
   at least one pointer plate, which comprises a start symbol, wherein the pointer plate is configured to revolve with respect to the scale in such a manner that the start symbol is settable to align with the symbol of any of the 12 notes of the scale, and
   wherein the pointer plate comprises N*7 pointers specific to a class of keys wherein, when the start symbol points to a base note of a key, the pointers specific to the class of keys point to the symbols of the notes of the key beginning at the base note.

2. The device according to claim 1, wherein N=1.

3. The device according to claim 1, wherein said at least one pointer plate comprises at least two sets of pointers, each set of pointers being specific to different classes of keys, wherein a first set is specific to a class of major keys and a second set is specific to a class of minor keys.

4. The device according to claim 3, wherein said first and second sets are located on opposite sides of the same pointer plate.

5. The device according to claim 1, further comprising pointers for indicating the symbols of notes comprised in a triad of the key in question.

6. The device according to claim 5, wherein the pointers for indicating the symbols of notes comprised in the triad are placed on the pointer plate.

7. The device according to claim 5, wherein the pointers for indicating the symbols of notes comprised in the triad are distinct pieces and the device additionally comprises a set of modular interval elements, wherein one or more interval elements can be placed between two consecutive pointers, wherein the modular interval elements can be combined to form an interval which is a multiple of a half-note interval.

8. The device according to claim 1, wherein the scale plate comprises cutouts corresponding to the keys of a keyboard instrument, the corresponding notes of which are not comprised in C major key.

9. The device according claim 8, wherein, when the device is rotated by 360° about an axis normal to a surface which comprises the pointers specific to the class of keys, while in contact with a supporting surface, the device advances laterally by a distance between 140 mm and 180 mm.

10. The device according to claim 1, wherein the device has a thickness in a direction normal to a surface which comprises the pointers specific to the class of keys, and wherein said thickness is at least 10 mm.

11. The device according to claim 1, wherein the device further comprises a handle for supporting the device by hand.

* * * * *